United States Patent [19]

Katagiri et al.

[11] 3,797,030

[45] Mar. 12, 1974

[54] INTERMITTENT TAPE DRIVE TYPE DATA RECORDER

[75] Inventors: Toshio Katagiri; Tokuji Suga, both of Neyagawa; Shoji Omiya, Shijonawate; Isamu Matsuda, Yao, all of Japan

[73] Assignee: Matsushita Electric Industrial Co. Ltd., Osaka, Japan

[22] Filed: Aug. 31, 1971

[21] Appl. No.: 176,509

[30] Foreign Application Priority Data

| | | |
|---|---|---|
| Sept. 3, 1970 | Japan | 45-77334 |
| Sept. 4, 1970 | Japan | 45-77665 |
| Dec. 24, 1970 | Japan | 45-131476 |
| Dec. 24, 1970 | Japan | 45-131477 |

[52] U.S. Cl. .... 360/52

[51] Int. Cl. .... G11b 15/20

[58] Field of Search .... 318/138, 685, 696; 340/174.1 A, 174.1 G, 174.1 H

[56] References Cited

UNITED STATES PATENTS

| | | | |
|---|---|---|---|
| 3,614,757 | 10/1971 | Burr | 340/174.1 A |
| 3,328,658 | 6/1967 | Thompson | 318/696 |
| 3,349,547 | 10/1967 | Dunne | 318/696 |
| 3,466,517 | 9/1969 | Leenhouts | 318/696 |
| 3,475,667 | 10/1969 | Newell | 318/696 |
| 3,641,584 | 2/1972 | Miller | 340/174.1 A |

*Primary Examiner*—James W. Moffitt
*Attorney, Agent, or Firm*—Stevens, Davis, Miller & Mosher

[57] ABSTRACT

An intermittent tape drive type data recorder using a magnetic tape cassette as magnetic recording medium and employing a step motor for the capstan drive, whereby handling of the recording medium is facilitated and fully satisfactory intermittent magnetic tape drive characteristic can be achieved with a small-size construction to ensure reliable data recording and reproduction.

4 Claims, 5 Drawing Figures

INTERMITTENT TAPE DRIVE TYPE DATA RECORDER

The present invention relates to data recorders using cassettes having a magnetic tape as the recording medium.

Data recorders are employed for recording various data, particularly digital information. However, prior-art data recorders present various problems. A typical prior art data recorder using a Phillips cassette is shown in FIG. 1 of the accompanying drawing. Referring to the Figure, numeral 1 designates a base frame, numeral 2 a Phillips cassette accommodating a magnetic tape, numeral 3 a magnetic head, numeral 4 a mount of the magnetic head 3, numeral 5 a slide member carrying the magnetic head mount 3 secured thereto and formed with slots 6, 7 and 8, numerals 9, 10 and 11 guide pins extending through the respective slots to guide the movement of the slide member, numeral 12 a tape drive motor having a rotor shaft 13 thereof serving as a capstan and capable of being inserted into a hole 14 provided in the cassette 2, numerals 15 and 16 reel shafts, numerals 17 and 18 reel drive motors, and numeral 19 a pinch roller arm rotatable about a fulcrum pin and carrying a pinch roller 21 at the free end. When an electromagnet (not shown) is magnetized, the slide member 5 and pinch roller arm 19 are attracted toward the cassette 2, urging the magnetic head 3 against the magnetic tape within the cassette and the pinch roller 21 against the capstan 13. When the electromagnet is de-magnetized, the slide member 5 and pinch roller arm 19 are returned to their initial positions by means of springs (not shown).

If the above construction adopts a single capstan design like that of the usual large-size magnetic tape apparatus employing a magnetic tape one half an inch wide, the tape should be drawn out of the cassette and passed around the capstan. Therefore, the construction is very complicated. Also, the size of the unit cannot be reduced.

Accordingly, the tape drive must have resort to a pinch roller and capstan couple like that adopted in tape recorders for sound recording. In such case, there are considered two methods for realizing an intermittent tape drive type data recorder, in which the intermittent period between start and stop of the tape progress is required to be extremely short. One of the methods utilizes a d-c servo-motor, which has low inertia and can be quickly started and stopped, for the capstan drive motor 12 in the construction of FIG. 1. In this case, the motor is repeatedly started and stopped while holding the pinch roller 21 urged against the capstan 13, thus achieving the intermittent drive of the tape. In the other method, the capstan 13 is continuously rotated at a constant speed and the pinch roller 21 is intermittently urged against the capstan 13 by means of a magnet so as to cause intermittent progress of the tape.

However, in the former method if a print motor is used as the d-c servo-motor, it must be quite large in order to quickly start and stop the tape, so that the construction of FIG. 1 is no longer possible. Also, the motor current should be very large. Further, such additional parts as motor speed detector and a servo-amplifier are required to control the motor, which inevitably complicates the construction. Therefore, it is impossible to provide a recorder of small size and simple construction.

In the latter method, the constant-speed drive of the capstan can be readily achieved with a comparatively small motor, so that the construction can be simpler. However, since the pinch roller is repeatedly urged against the tape and detached therefrom at a high repetition frequency, there are problems regarding the mechanical service life of the pinch roller system and damage to the tape due to shocks when the pinch roller strikes the tape. Also, since appreciable time is required for the attraction of the pinch roller by the magnet, it is impossible to achieve a very high step rate of the intermittent tape progress.

The invention is intended in the above aspects, and it has an object of providing an intermittent tape drive type data recorder using a step motor, which is small in size and simple in construction.

Another object of the invention is to facilitate the handling of the magnetic recording medium of an intermittent tape drive type data recorder by using a cassette accommodating a narrow magnetic tape as the recording medium.

A further object of the invention is to provide an intermittent tape drive type data recorder provided with means to drive the afore-said step motor, which is suited to record and reproduce data in steps of one unit piece of data such as one word or character in one step on and out of a narrow magnetic tape.

According to the present invention, there is provided an intermittent tape drive type data recorder comprising a cassette having a narrow magnetic tape, a capstan for driving said magnetic tape, a step motor for driving said capstan, a step motor drive means for actuating said step motor intermittently in a plurality of steps, and means to record one unit piece of data on said magnetic tape during continuous running of said step motor.

The above and other objects, features and advantages of the invention will become more apparent from the following description, when read in conjunction with the accompanying drawing, in which.

Figure 2:
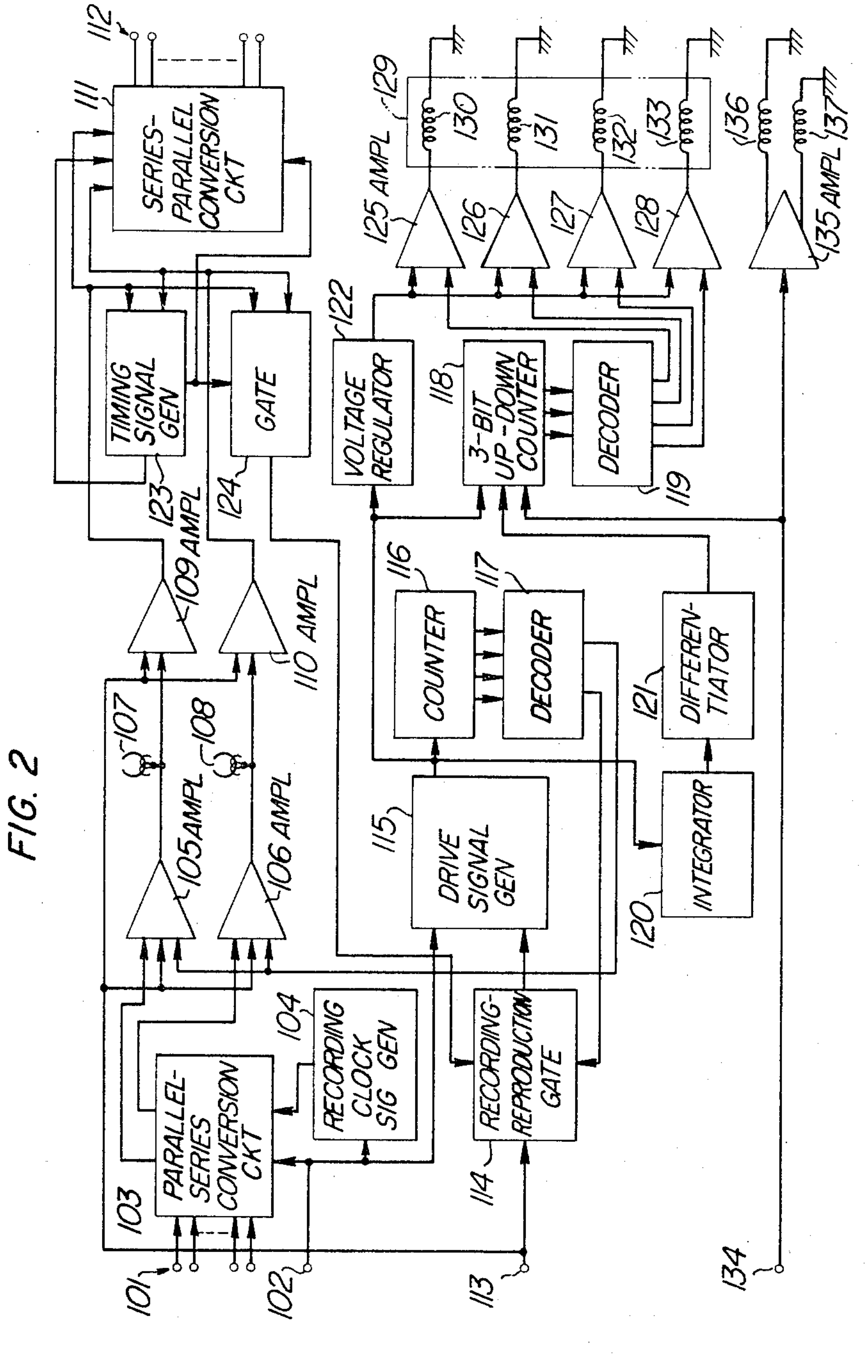
FIG. 2 is a block diagram showing part of the intermittent tape drive type data recorder embodying the invention.

Referring now to FIG. 2, which shows an embodiment of the invention, reference numeral 101 designates data input terminals, numeral 102 a write/read start signal terminal, and numeral 103 a parallel-series conversion circuit consisting of shift registers.

Numeral 104 designates a recording clock signal generator. In recording, it starts to deliver clock pulses from an instant of a predetermined time after the arrival of a write start signal, and it becomes inoperative after it has delivered the same number of clock pulses as the number of bits in one word of data.

Numerals 105 and 106 designate respective first channel and second channel recording amplifiers, numerals 107 and 108 respective first channel and second channel magnetic heads, numerals 109 and 110 designate first channel and second channel reproducing amplifiers, numeral 111 a series-parallel conversion circuit, numeral 112 data output terminals, and numeral 113 a recording-reproduction changeover terminal.

Numeral 114 designates a gate circuit for a recording-reproduction change-over. In recording it permits output of a decoder 117 as a stop signal for stopping a step motor drive signal generating oscillator 115, while in reproduction it permits output of a stop pulse detection gate 124 as the stop signal.

The step motor drive signal generating oscillator 115 starts its oscillation by a start signal, and the frequency of its oscillation is set such that self-starting and continuous running of a step motor can be ensured.

Numeral 116 designates a counter to count the output pulses of the oscillator 115. In recording, when it has counted a predetermined number (15 in the instant embodiment) of its input pulses, it delivers a stop signal through a decoder 117 and the gate 114 to the oscillator 115 to stop the same, while simultaneously giving a regulating signal to the recording amplifiers 105 and 106 so as to regulate head current for the magnetization of the magnetic tape in one direction. The operative period of the oscillator 115 is set to correspond to a period during which one unit piece of data such as one word or character is recorded on the magnetic tape by the magnetic heads 107 and 108.

Numeral 118 designates a three-bit up-down counter, which is coupled to a decoder 119, which in turn feeds amplifiers 125 to 128 for successively energizing motor coils 130 to 133 of a step motor 129 (corresponding to the capstan drive motor 12 shown in FIG. 1) so as to drive the same.

Numeral 120 designates an integrator circuit to integrate the output of the oscillator 115 so as to produce an output for a constant period. A differentiator circuit 121 amplifies and differentiates the output of the integrator circuit 120 to produce an output which is supplied to the step motor.

Numeral 122 designates a step motor voltage regulator acting to reduce a regular step motor voltage from an instant a predetermined time after the starting of the oscillation of the oscillator 115 and before the reaching of a preset motor speed by the step motor, thereby reducing the momentum of the rotor of the step motor to prevent overshoot thereof. After the period of overshoot has been passed, it re-increases the voltage to the regular level for normal running of the motor.

Numeral 123 designates a read-out timing signal generator for combining the first and second channel reproduced signals into a train of read-out clock pulses, thereby the first and second channel reproduced signals being successively registered in the series-parallel conversion circuit 111. Concurrently, it integrates the resultant read-out clock pulses to produce a continuous signal, which continues to prevail for a constant time after the last clock pulse, and at the end of which a read-out timing signal is produced and fed to the series-parallel conversion circuit 111. During the presence of the read-out timing signal, the series-parallel conversion circuit 111 provides its output to the data output terminals 112. At this time, the series-parallel conversion circuit 111 holds its input gate closed.

Numeral 124 designates a gate, which also receives the read-out timing signal and is held open during the presence thereof to permit a reproduced stop signal from the first or second channel reproducing amplifier to be supplied through the change-over gate 114 to the step motor drive signal generator 115 to stop the same.

Numeral 134 designates a forward-reverse changeover input terminal. By inverting the polarity of the input to this terminal, the direction of counting of the up-down counter 118 is reversed, as well as inverting the polarity of voltage supplied through a reel drive motor voltage supply amplifier 135 to reel drive motors 136 and 137 (corresponding to motors 17 and 18 in FIG. 1). Thus, the direction of travel of the tape can be switched between forward and reverse. The reverse drive is used only for back-spacing the tape, and is never used for writing or reading.

Now, description will be made of the operation of the above-mentioned embodiment.

Figure 1:
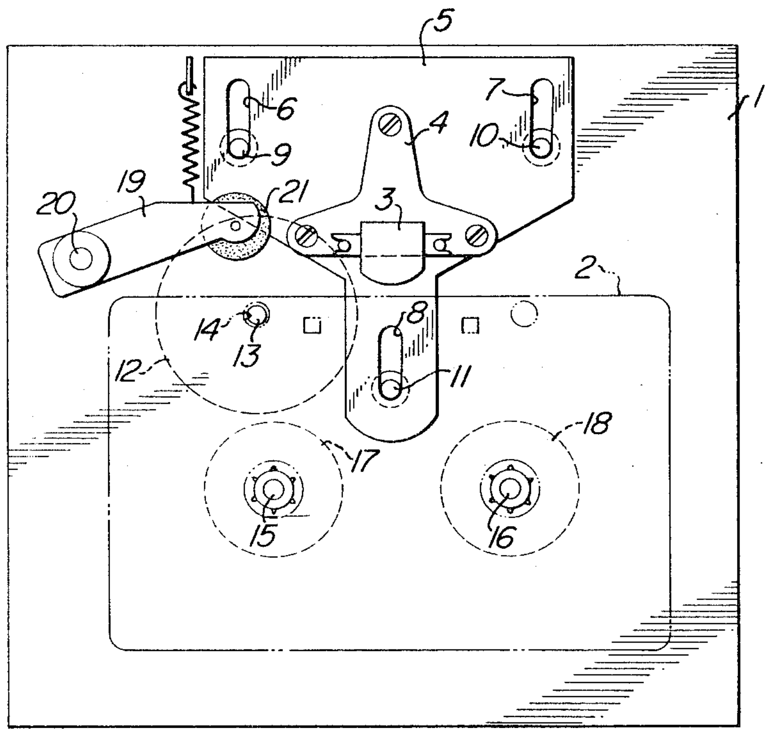
FIG. 1 PRIOR ART
FIG. 1 is a schematic representation of the essential part of a Phillips cassette type data recorder.

The intermittent tape drive type data recorder according to the invention can have a construction as shown in FIG. 1 with the tape drive motor 12 being a small-size step motor having the rotor shaft thereof constituting the capstan 13.

In recording and reproduction, the pinch roller arm 19 and slide member 5 are held attracted to the cassette 2, with the pinch roller 21 held urged against the capstan 13 and the magnetic head 3 against the magnetic tape within the cassette 2 by an electromagnet (not shown). The reel motors 17 and 18 are furnished with suitable voltages, so that the motor 17 is ready for producing a torque sufficient to take up the tape and the motor 18 is ready for producing a torque corresponding to a suitable back tension. In this state, if the step motor 13 is started the tape will proceed in correspondence to the rotational angle of the step motor and will be taken up by the take-up reel.

RECORDING

When an input signal (A in FIG. 3) appears at the start signal terminal 102, parallel input data prevailing at the data input terminals 101 are registered in the parallel-series conversion circuit 103. At the same time, the oscillation of the step motor drive signal generating oscillator 115 is started to deliver a step motor drive signal at a constant frequency (B in FIG. 3). Simultaneously with the starting of the delivery of the step motor drive signal the integrator circuit 120 provides output (C in FIG. 3). As a result, the individual coils of the step motor 129 are energized as indicated at J, K, L and M in FIG. 3. (In this embodiment, 1–2 phase drive of the step motor is adopted.)

Figure 3:
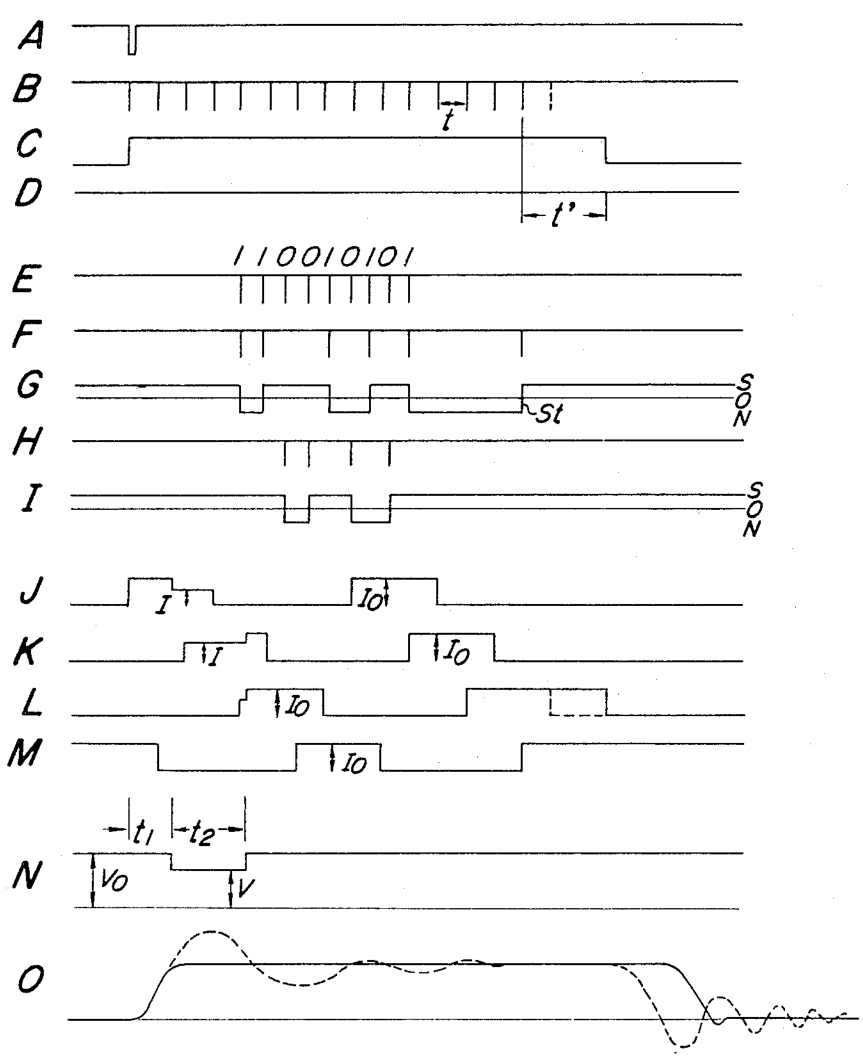
FIG. 3 is a waveform chart to illustrate the operation of the block diagram of FIG. 2 in recording.

Meanwhile, the voltage impressed on the step motor remains $V_0$ till the end of a period $t_1$ after the appearance of the start signal, and after period $t_1$ it is decreased to $V$ and then at end of the period $t_2$ it returns to $V_0$, as shown at N in FIG. 3. Thus, the motor torque is reduced during the period $t_2$. At this time, the tape speed smoothly rises as indicated by the solid line at 0 in FIG. 3. However, if the step motor voltage is not reduced but is continuously held at the constant value $V_0$, overshoot results as indicated by the dashed line.

After the start of the step motor a certain time sufficient for the tape speed to reach a constant level is passed before the recording clock signal generator 104 starts to provide a clock signal at a constant clock frequency (E in FIG. 3). By this clock signal, the input data stored in the parallel-series conversion circuit 103 is transferred to the first channel and second channel write amplifiers 105 and 106 as signals respectively shown at F and H in FIG. 3. The write amplifiers then provide outputs (G and I in FIG. 3) to the first and second channel recording heads 107 and 108 for recording in the NRZI (nonreturn-to-zero-on-one) mode.

As soon as the step motor drive signal generator delivers 15 pulses, for example, the counter 116 gives a stop signal through the decoder 117 to the step motor drive signal generator so as to stop the same, while simultaneously giving a regulating signal to the first and second channel write amplifiers 105 and 106 so as to regulate the head current in a constant direction. Thus, the first and second channel write-in signals result in respective magnetic patterns as shown at G and I in FIG. 3. A predetermined time after the writing of stop signal St with the stop of the delivery of the output of the step motor drive signal generator to the integrator circuit 120, the output of the integrator circuit vanishes (C in FIG. 3). The differentiator circuit 121 differentiates the falling of the output of the integrator circuit 120 to produce an output pulse (D in FIG. 3), which is supplied through the counter 118 to the motor. This last step signal is provided for preventing the hunting of the step motor. This feature will now be discussed in detail with reference to FIG. 5.

Figure 5:
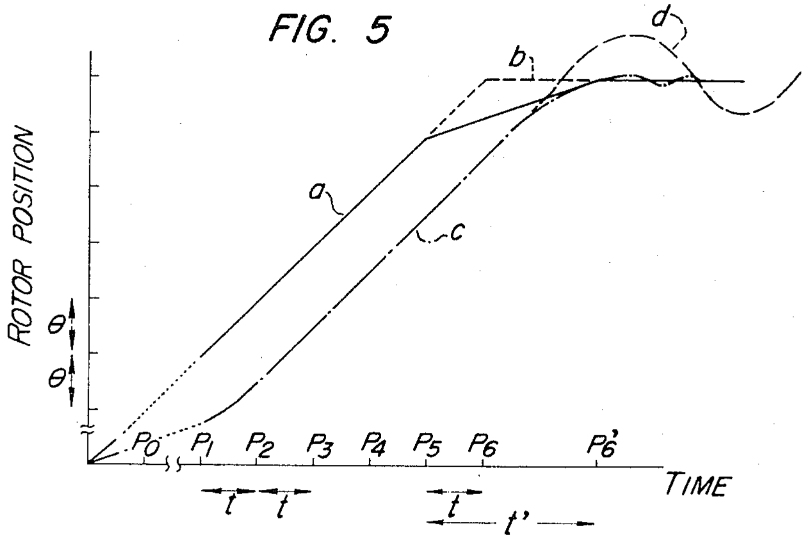
FIG. 5 is a graph showing a characteristic of a step motor in the data recorder according to the invention.

In FIG. 5. The ordinate represents angular position of the rotor of the step motor, and the abscissa represents time. $P_1$ to $P_6$ correspond to instants of pulses given to the step motor. Solid line *a* is plotted for rotor positions to be assumed when the rotor stops in correspondence to the respective pulses $P_1$ to $P_6'$. Broken line *c* is plotted for positions of the rotating rotor at the instant of the respective pulses $P_1$ to $P_6'$. The difference between these lines indicates that the rotor response to the impressed pulses is delayed due to the momentum and load of the rotor. Dotted lines *b* and *d* are plotted to indicate variations in the lines *a* and *c* when the step motor stops at the time of $P_6$ instead of $P_6'$, respectively. If the last step pulse, by which the final rotor position is assumed to be determined, is set to be at instant $P_6$, the rotor further runs at a constant speed for some time after the instant $P_6$ and the deceleration of the rotor sets in only after the final rotor position set to be assumed has been passed due to the aforementioned delay of the rotor response to the impressed pulses, thus resulting in a great amount of hunting as indicated by dashed line *d*. On the other hand, if the last step pulse is set to be at instant $P_6'$ distant from the proceding pulse instant by an interval *t'* which is longer than the pulse interval *t* between adjacent step pulses during the normal running of the rotor, the deceleration of the rotor starts to stop the rotor at instant $P_5$, and the step pulse is set to stop the rotor upon approaching a stop position corresponding to the instant $P_6'$, that is, the position at which the rotor speed approaches zero, so that the rotor can be stopped very smoothly with only very slight hunting taking place as indicated at *c*. Referring to FIG. 3, dashed lines at B, L and O correspond to the case of setting the last step pulse to instant $P_6$. It will be apparent from the dashed line at D in FIG. 3 that the tape vibrates considerably back and forth before it is stopped, thus increasing time required for the stopping. This will give rise to various problems. For example, if the interval between adjacent recorded words is made small compared to the instant embodiment (for the purpose of improving the performance of the recorder by increasing the word density), it is likely to misread part of the following word or the afore-mentioned stop signal st many times before the motor stops. Such undesired malfunctioning can be eliminated by delaying the last step pulse.

In the above manner the writing of one word ends, and the sequence is repeated on and on. Data is recorded on the tape so that there exists at least one stable point or position of the stepping motor where the rotor can stop between the positions where the last bit of a unit piece of data is recorded on the tape and the position where the first bit of the subsequent unit piece of data is recorded on the tape.

REPRODUCTION

In reproduction, the polarity of the input signal to the recording-reproduction change-over terminal 113 is inverted, whereby current supply to the recording amplifiers 105 and 106 is removed. Also, the reproducing amplifiers 109 and 110 are rendered operative. Further, the gate 114 is changed over to the reproduction state so that the step motor drive signal generating oscillator 115 can stop oscillation by the output from the stop pulse detection gate 124.

Figure 4:
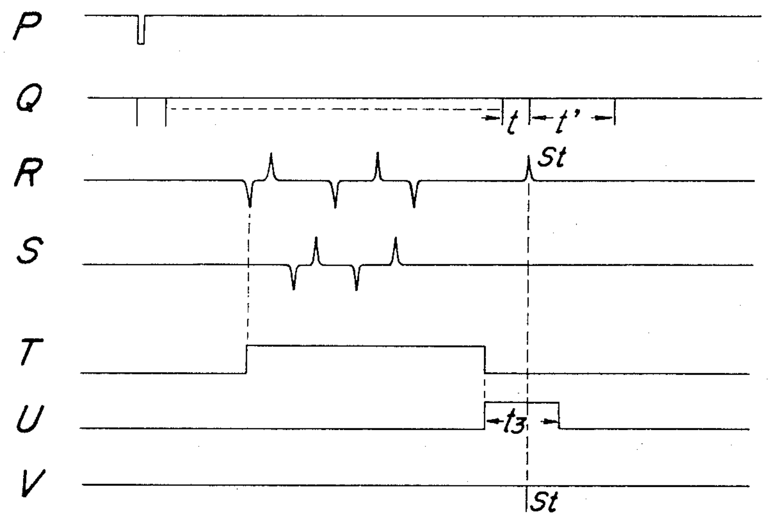
FIG. 4 is a waveform chart to illustrate the operation of the block diagram of FIG. 2 in reproduction.

In this state, when a start pulse is impressed on the start signal terminal 102 (P in FIG. 4), the step motor drive signal generator 115 starts to deliver step pulses of the same repetition period t as in the recording to the counter 118 and renders the step motor voltage control circuit 122 operative, so that the tape is driven in the same way as in the recording. Data recorded on the magnetic tape are reproduced by the first and second channel magnetic heads 107 and 108. The outputs (R and S in FIG. 4) of the respective magnetic heads 107 and 108 are amplified and shaped by the amplifiers 109 and 110 before being coupled to the series-parallel conversion circuit 111, readout timing signal generator 123 and gate 124. The read-out timing signal generator 123 combines the outputs of the first and second channel reproducing amplifiers 109 and 110 into a train of read-out clock pulses, whereby the outputs of the first and second channel amplifiers 109 and 110 are successively registered in the series-parallel conversion circuit 111 while the read-out clock pulses are integrated. By the integration of the clock pulses a continuous signal (T in FIG. 4) is produced, which vanishes a predetermined time (longer than one clock period) after the last clock pulse. The vanishing or falling of the continuous signal is utilized to actuate, for instance, a monostable multivibrator for producing a read-out timing signal (U in FIG. 4), which is fed to the series-parallel conversion circuit 111 and gate 124. During the period $t_3$ of the read-out timing signal the series-parallel conversion circuit 111 holds its input gate closed and its output gate open, thus transferring its parallel read-out signals to the respective data output terminals 112. Also, during this period $t_3$ the gate 124 is held open and permits the reproduced stop signal St, which has been recorded by the first channel head at the 15th step pulse in the recording, to the step motor drive signal generator 115 for stopping the oscillation thereof. Upon ending of the generation of the step pulses, the integrator and differentiator circuits 120 and 121 are actuated in the same manner as in the recording, thereby preventing the hunting to smoothly stop the tape. In the above manner, the reading of one word is completed.

The stop signal may be reproduced by the second head depending upon the signal pattern in recording. In this case, the gate 124 similarly permits the stop signal. In either case, the last step pulse is detected so that the rotor may stop substantially in the same position as in the recording.

As has been described in the foregoing, the data recorder according to the invention uses a step motor, so that it can be small in size and simple in construction. Also, the motor control circuit can be simplified. Further, an excellent start and stop characteristic and a high step rate, i.e., the number of steps per second, can be obtained.

Furthermore, since provisions are made for preventing overshoot and hunting, a smooth intermittent tape drive can be obtained, thus eliminating miswriting and misreading of the data as well as providing for an increased step rate.

Still further, the angle of rotation of the step motor in each step is constant and hence, the distance traveled by the tape in each step in recording is constant, so that if an error is committed in manually writing data (using a keyboard and the like) it is possible to re-write correct data by back-spacing the tape for a length corresponding to one word.

Moreover, in reading the tape is stopped by detecting the last bit in each word or character, so that it can be stopped at correct positions. This is advantageous in addition to the constant angle of rotation of the step motor in that when a reading error is committed, it is possible to re-read by merely back-spacing the tape for a length corresponding to one word. It is also possible to correct an error in writing or reading.

What we claim is:

1. An intermittent tape drive type data recorder comprising a cassette having a narrow magnetic tape; a capstan for driving said magnetic tape;

a step motor for driving said capstan; step motor drive means for actuating said step motor intermittently in a plurality of steps, wherein said stepping motor is driven such that the motor runs continuously at substantially constant speed;

means to record one unit piece of data on said magnetic tape serially or both serially and in parallel for said plurality of steps during continuous running of said step motor;

a counter to count the number of step pulses for driving said step motor in the continuous running of said step motor at the time of recording; means to stop said step motor at a position of the step motor advanced at least one step from the position of the step motor at the time when said counter counts a number of step pulses corresponding to the information quantity of one unit piece of data;

and a means to detect the last bit of each unit piece of data reproduced from said magnetic tape, said detected bits being utilized to control said step mtoor drive means so as to bring said step motor to a halt.

2. The intermittent tape drive type data recorder according to claim 1, wherein said step motor drive means is adapted to produce a step signal for causing one continuous step of running of said step motor, said step signal consisting of a train of step pulses uniformly spaced except for the last one, the time interval between the last but one step pulse and the last step pulse being longer than the time interval between two adjacent uniformly spaced step pulses, thereby to reduce the hunting of said step motor.

3. The intermittent tape drive type data recorder according to claim 1, wherein said step motor drive means includes a step signal generator to supply step pulses to said step motor, an integrator to integrate said clock pulses so as to produce an output for a constant period, a differentiator to differentiate the output of said integrator, and a last step pulse generator to produce the last step pulse for each continuous step of running of said step motor according to the output of said differentiator.

4. The intermittent tape drive type data recorder accorlding to claim 1, wherein said step motor drive means includes a voltage regulator to reduce a regular step motor voltage from an instant after the generation of the first one of a group of step pulses for each continuous step of running of said step motor and before the reaching of a final motor speed by said step motor, said regular step motor voltage being recovered after the kinetic energy stored in the rotor of said step motor is lost.

* * * * *